INVENTOR.
MORRIS H. KATZ
BY
ATTORNEY

United States Patent Office 3,582,357
Patented June 1, 1971

1

3,582,357
EDIBLE MIX COMPOSITION FOR PRODUCING
AN AERATED PRODUCT
Morris H. Katz, St. Louis Park, Minn., assignor to The
Pillsbury Company, Minneapolis, Minn.
Continuation-in-part of application Ser. No. 574,600,
Aug. 24, 1966. This application Mar. 24, 1969, Ser.
No. 809,911
The portion of the term of the patent subsequent to
Mar. 25, 1986, has been disclaimed
Int. Cl. A23g 3/00, 5/00
U.S. Cl. 99—139                                    59 Claims

ABSTRACT OF THE DISCLOSURE

Edible dry mix compositions for producing an aerated product of a fine, smooth, creamy consistency and containing less than 8 percent by weight fat and proteinaceous material are provided by a dry mix which contains a water-soluble film forming polysaccharide in combination with a surfactant system comprised of at least one glycerol fatty acid monoester and at least one propylene glycol fatty monoester.

---

This application is a continuation-in-part of U.S. Pat. 3,434,848.

This invention relates to food compositions adaptable for human consumption. More particularly, this invention relates to edible premixes containing at least one water soluble, film forming polysaccharide as the principal gas retention agent therein.

Heretofore, powdered, hydratable dessert mixes adaptable for use in whipped products such as fillings, custards, ice cream, sherbet, puddings, toppings and the like, employing powdered fat and/or porteinaceous materials have been prepared. U.S. Pat. No. 3,098,748 by P. P. Noznick, et al. discloses a powdered shortening containing from 1 to 10 percent propylene glycol monostearate. In order to enhance the whipping effect thereof, it is necessary to empoly proteinaceous materials in amounts ranging from 1 to 15 percent by weight of the total dry mix. Also, it is necessary to employ various gums such as carrageenin, sodium alginate, gum tragacanth, gum acaia, gum karaya, locust bean and the like at relatively low concentration to provide the necessary stability and stiffness.

Similarly, U.S. Pat. No. 2,913,342 by Cameron, et al. stituted and whipped with an aqueous liquid.
discloses a dehydrated mix which upon rehydration and whipping provides an aerated product. In Cameron et al. the employment of fat and proteinaceous material is deemed essential to provide an aerated product.

It is an object of the present invention to provide a dry dessert mix which upon rehydration combines the properties of superior mouthfeel, body, texture and appearance.

A further object is to provide a dry premix containing at least one water-soluble, film forming polysaccharide which will provide an aerated food product when reconstituted and whipped with an aqueous liquid.

2

An additional object of the invention is to provide a polysaccharide based, buffer salt-free, dry mix capable of being hydrated with an aqueous liquid to a "short" custard gel character without concomitant pasty, stringy or gummy gel character.

A further object of the invention is to provide an aerated food product of a smooth, creamy consistency which does not necessitate the presence of proteinaceous materials or fat.

According to the present invention there is provided an edible dry mix composition containing less than 8 percent by weight triglyceride fat and proteinaceous material and which upon hydration and mixing provides an aerated food product of a fine, smooth, creamy consistency having a short gel reading of less than 35, said mix composition comprising at least one hydrophilic film forming polysaccharide and a surfactant composition, said polysaccharide being provided in the mix in an amount sufficient to provide a peak torque ranging from about 100 to about 180 scale units when 240 grams of mix, absent the other mix ingredients but including the amount of polysaccharide provided in said 240 grams of mix, is reconstituted with 220 grams of sucrose in 473 grams of water and the amount of surfactant composition on a dry weight ratio basis of polysaccharide to surfactant composition ranges from about 200:1 to about 1:200, said surfactant composition comprising at least one glyceryl monoester of a fatty acid and at least one propylene glycol fatty acid monoester, said mix containing a weight ratio of glyceryl monoester to propylene glycol monoester ranging from about 1:10 to about 10:1.

The mix compositions provided herein, upon hydration and aeration with an aqueous liquid such as water or milk, provide a resultant product of a fine, smooth and creamy consistency. Unlike the previous hydrated and aerated dry mixes, the instant dry mix compositions rely principally upon a water-soluble polysaccharide possessing film forming properties in combination with the surfactant composition to provide the ultimate whipped product. The dry mix compositions thus provide a whipped dessert product without necessitating the employment of fats, oils and proteinacous materials heretofore deemed essential.

The polysaccharide hydrophilic film formers adaptable to the present invention have the physical characteristics of being hydrophilic colloid-forming, water dispersible, organic solvent-phobic (i.e., generally insoluble in organic liquids) and amorphous. Upon addition to water, these polysaccharides have the characteristic of balling and/or agglomerating and/or forming thick sticky masses even in the presence of very large quantities of water. In general, the employable polysaccharides behave much like flour when added to water in that they "ball" or form lumps in which there is a pasty skin of wetted hydrocolloid enclosing a core of dry gum. The polysaccharide film formers have a tendency to agglomerate (i.e., to clump and form soft, semi-solid masses in water).

Both naturally occurring and synthetically produced polysaccharides may be employed in the present invention. Typical polysaccharides are the tree and shrub exudations, the seaweed colloids, seed extracts, gelatinized starches and starch derivatives (e.g., converted starches, water-dispersible cellulose derivatives, the pectins, etc.). More specifically, illustrative hydrophilic film forming polysaccharides include the water-dispersible cellulose derivatives such as sodium carboxymethyl cellulose, hydroxypropylmethyl cellulose ether, carboxypolymethyl cellulose, hydroxypropylethyl cellulose ether, hydroxypropyl cellulose ether; the tree and shrub extracts such as tragacanth, arabic, ghatti, furcelleran and the salts of furcelleran (sodium, calcium, potassium and ammonium salts), karaya; seaweed colloids such as agar, carrageenin and the salts thereof (e.g., ammonium, calcium, potassium and sodium salts) the alginates (e.g., the calcium, potassium, sodium alginates and propylene glycol alginates), gelatinized starches and starch derivatives (e.g., hydroxypropyl starch, modified starches such as those treated with succinic anhydride, sodium hydroxide, aluminum sulfate, dextrin including corn syrups containing dextrin, etc.); pectins such as citrus and apple pectins, low methoxyl pectin and sodium pectinate; seed extracts such as locust bean, quince, oat gum and guar gum and other gum-like natural and synthetic hydrophillic colloids such as dextrin and certain microbiologically produced polysaccharides such as disclosed in U.S. Pat. No. 3,301,848 by Frank E. Halleck; *Xanthamonas compestris* produced polysaccharides such as disclosed in the Canadian Journal of Chemistry, vol. 42 (1964), pages 1261-1269, mixtures of hydrophilic colloids and the like.

The amount of polysaccharide contained in the mix will depend largely upon the ultimate type of food product desired and the film forming characteristics of the polysaccharide employed. Polysaccharide hydrophilic film formers which provide extremely viscous, aqueous solutions necessitate on a weight basis less polysaccharides than those possessing a lower viscosity. In addition, highly aerated dessert products generally require a higher weight percent of polysaccharide than food products of a greater density.

In general, the amount of hydrophilic film forming polysaccharide provided in the mix should be sufficient to provide a peak torque ranging from about 100 to about 180 scale units when 240 grams of the mix is reconstituted with 473 ml. of water. The scale units are ascertained by the viscosity measurements determined on a Haake Rotovisko at 25° C. and 243 r.p.m. using Roto-visko cup type SV and SVII bob.[1] The appropriate amount of hydrophilic film former thereof may be determined by the following equation:

$$T = ae^{bx^n}$$

wherein T represents the peak torque (i.e., maximum torque for a given amount of polysaccharide), $e$ is a constant having a value of 2.718, i.e., $e$ is the base of natural logs), X is the grams of a particular polysaccharide hydrophilic film former in 473 grams of water, $a$ is the peak torque value without the polysaccharide with $b$ and $n$ representing constants for the particular gum employed. Both $b$ and $n$ in the aforementioned T equation may be determined from known values of X and the peak torque values achieved for different concentrations of the particular gum employed. By plotting the log T of a particular hydrophilic film former at different concentrations, the slope for various log T values may be determined. The slope of the resultant log T curve represents the $b$ and $n$ values for the particular hydrophilic film former tested thereby.

For example, assume that it is desired to provide a mix containing 220 grams of sucrose with the polysaccharide film former being sufficient to provide a peak torque of 130 scale units (i.e., at 273 r.p.m. and 25° C.) when the mix (i.e., 220 grams of sucrose and film former) is reconstituted in 473 ml. of water. Since 220 grams of sucrose dissolved in 473 grams of water provided a peak torque of 0.7663, the appropriate $b$ and $n$ values for various hydrophilic film formers as ascertained by different peak torque values for at least two different concentrations thereof is calculated from the following equation:[2]

$$T = 0.7663 e^{bx^n}$$

$$T_1 = a_o e^{bx_1^n} \quad Y_1 = bx_1^n$$
$$T_2 = a_o e^{bx_2^n} \quad Y_2 = bx_2^n \rightarrow \left(\frac{Y_1}{Y_2}\right) = \left(\frac{X_1^n}{X_2}\right)$$

$$\frac{T_1}{a_o} = e^{bx_1^n}$$
$$\frac{T_2}{a_o} = e^{bx_2^n} \quad \log_{10}\left(\frac{Y_1}{Y_2}\right) = n \log_{10}\left(\frac{X_1}{X_2}\right)$$

$$Y_1 = \log_{10} e\left(\frac{T_1}{a_o}\right) = bx_1^n \quad n = \frac{\log_{10}\left(\frac{Y_1}{Y_2}\right)}{\log_{10}\left(\frac{X^1}{X_2}\right)} \quad b = \frac{Y_1}{X_1} n$$
$$Y_2 = \log_{10} d\left(\frac{T_2}{a_o}\right) = bx^{2n}$$

Although the $b$ and $n$ values utilized to ascertain the appropriate amount of gum necessary to provide a desired peak torque may be obtained by different but equivalent testing methods, the aforementioned testing procedure provides a satisfactory means therefor. Unless expressly stated otherwise, the amount of polysaccharide used and the scale units recited in the claims are based upon the aforementioned test procedure.

Typical $b$ and $n$ values as well as the amount of hydrophilic film former in combination with 220 grams of sucrose necessary to provide a peak torque value of 130 under the above testing procedure are as follows:

| Film former | b | n | Amount needed, in grams |
|---|---|---|---|
| Locust bean gum | 0.294 | 1.000 | 17.5 |
| Gum tragacanth | 1.885 | 0.344 | 17.4 |
| Pectin, low methoxy | 1.010 | 0.527 | 21.75 |
| Poly-1,3β glucoside | 1.717 | 0.398 | 15.5 |
| Guar gum | 2.029 | 0.367 | 11.8 |
| Sodium carboxymethyl cellulose | 3.027 | 0.225 | 7.5 |
| Pregelatinized tapioca starch | 0.170 | 1.000 | 29.5 |
| Waxy maize | 0.123 | 1.000 | 41.4 |
| Instant milo | 0.145 | 1.000 | 34.2 |

In the present mixes the polysaccharide hydrophilic film former in combination with surfactant compositions in appropriate amounts provide the desired short gel character of the food product. As previously mentioned, the edible dry mixes contain less than 8 percent by weight triglyceride fat and proteinaceous material with the polysaccharide film former being at least a major factor in providing a peak torque value of about 100 to about 180 scale units when 240 grams of the mix is reconstituted in 473 grams of water. Superior food products having an appropriate short gel character are provided when the amount of polysaccharide provided in the mix is sufficient to provide a peak torque ranging from 120 to 160 scale units with the polysaccharide providing at least 80 percent of the peak torque scale units (i.e., mix without polysaccharide would be no greater than 32 scale units). Sufficient amount of polysaccharide film former to impart a peak torque value ranging from 130 to 150 scale units with the mix portion excluding the polysaccharide providing no more than 10 percent of the peak torque value thereof (i.e., polysaccharide provides 90 percent of the peak torque) provide superior aerated products having an appropriate short gel character.

Polysaccharides employable in the present mixes and as defined herein are distinguished from oligosaccharides in

---

[1] Manufactured by Haake Bros., Berlin, Germany and distributed in the United States by Brinkman Instruments, Inc., Great Neck, N.Y., with each scale unit being equivalent to 0.4494 gram centimeters of torque.

[2] Thus, given two peak torque values for two different concentrations of a particular hydrophilic film former $b$ and $n$ may be calculated as follows:

that the latter contains 7 or less polymerized saccharide units whereas a polysaccharide has 8 or more saccharide units. As the degree of polymerization or molecular weight for a particular polysaccharide increases the film forming and gas retention thereof generally increases. A suitable polysaccharide of a relatively low molecular weight is dextrin (e.g., a mixture of hydrolyzed starch having a degree of polymerization ranging from 8 to less than 40 or 50 saccharide units). Comparatively, significantly greater amounts of dextrin on a weight basis are required in a mix than the high molecular weight polysaccharides such as sodium alginate, sodium carboxymethyl cellulose, propylene glycol alginate, poly-1,3$\beta$ glucoside, etc. Dextrins obtained by the incomplete hydrolysis of starch with dilute acids or by heating dry starch may be utilized as a polysaccharide ingredient herein. Similarly, dextrins obtained by enzymatic degradation of starch which contain a significant amount of mono- and oligosaccharides as well as polysaccharides may be employed.

Typical amounts of polysaccharides provided in the mix on a dry mix basis range from at least 0.25 weight percent for a very high viscous polysaccharide to about 90 weight percent for a low viscous polysaccharide. Superior aerated products of an appropriate short gel character (i.e., S test) are provided when the amount of polysaccharide on a total dry mix weight basis ranges from at least 1 percent to about 75 percent by weight. Preferably, at least 2 percent to about 50 percent of the total dry mix weight is a polysaccharide. When dextrin is employed as the principal polysaccharide mix ingredient (i.e., at least a major portion of the peak torque is contributed by dextrin), the amount thereof on a total mix weight basis ranges from about 20 to 90 weight percent dextrin and preferably about 35 to about 75 percent by weight dextrin.

Gelatinized starches adaptable herein are the precooked starches wherein the starch granules have been gelatinized. Such gelatinized starches absorb water and form a paste or gel upon the addition of cold water (20° C.) whereas ungelatinized or raw starches are insoluble in a cold aqueous system and merely disperse therein to form slurries. Suitable edible gelatinized starches that may be employed include corn, high amylose corn, wheat, oat, potato, waxy maize, tapioca, sorghum, sago, rice, arrowroot starches, mixtures thereof and the like. Typical gelatinized starches are raw starches which have been modified via oxidation, acid hydrolysis or esterification and then cooked. Exceptional results being achieved with a gelatinized tapioca starch. A gelatinized starch having a particle size finer than #80 U.S. Standard mesh is generally employed since starches of such a particle size disperse more rapidly in an aqueous medium.

The amount of gelatinized starch contained in the mix will depend largely upon the ultimate type of aerated food product desired. Highly aerated food products generally require a higher weight percent of gelatinized starch than food products of a greater density. In general, the amount of gelatinized starch is greater than at least 5 weight percent of the total mix ingredients. Illustrative amounts of gelatinized starch contained in the mix ranges from about 8 to about 98 weight percent of the total weight thereof. Preferably included are those mixes which contain from about 10 to about 40 weight percent gelatinized starch (based upon total mix weight).

Modification of the polysaccharide to provide a uniform textured dessert product of short gel character is provided by the surfactant composition. In the mix it is not essential to uniformly admix the polysaccharide and surfactant composition. However, it is essential to provide a mix containing the surfactant composition in a form capable of being dispersed in an aqueous medium. Thus, the surfactant composition can be included along with the polysaccharide as a single-stage mix recipe or separately packaged to provide a two-stage recipe mix.

Highly aerated dessert products of low solids content (e.g., whipped toppings) in comparison to high-solid, slightly aerated dessert products such as those of a custard consistency differ in regard to the best manner by which the polysaccharide modification is achieved.

In the highly aerated products the ratio of water to solids provided in the reconstituted product is relatively high. Consequently, less time is necessary to hydrate the polysaccharide. Accordingly, the time necessary to modify and maintain the short gel character thereof is greatly reduced. Thus, in highly aerated dessert products, it is desirable to include the surfactant composition in a readily hydratable form. Mixes containing a fast hydrating surfactant composition may be prepared by providing an admixture of polysaccharide in combination with a finely divided form of the surfactant composition. Another method of achieving a rapidly hydrating surfactant composition is to co-spray the melted surfactant composition which has been dispersed in a solution of a readily water-soluble, hydrophilic film former. In such spray-dried products, the surfactant composition is uniformly distributed throughout a matrix of the film former. Upon dispersion of the spray-dried product in an aqueous medium, the film former rapidly dissolves therein permitting uniform surfactant distribution throughout the aqueous medium. Uniform surfactant distribution provides uniform polysaccharide modification.

With high-solid, slightly aerated dessert products, the limiting factor is the hydration rate of the edible film forming polysaccharide. Hydration thereof can be expediated by employing warm or hot aqueous mediums. A readily hydratable surfactant composition, however, will facilitate the hydration rate and modification of the polysaccharide.

In general, polysaccharide hydrophilic film formers having a molecular weight in excess of 20,000 provide higher peak torque scale readings than those of a lesser molecular weight. Hydrophilic polysaccharide film formers which provide relatively viscous aqueous mediums and have a molecular weight of at least 50,000 or in excess of 100,000 provide a further reduction in the amount of polysaccharide necessary to the peak torque values hereinbefore described.

Surfactant compositions adaptable to the instant mixes comprise at least 1 glyceryl fatty acid monoester and at least 1 propylene glycol fatty acid monoester. In general, at least a major portion of the surfactant composition consists of the propylene glycol fatty acid monoester and glyceryl fatty acid monoester. Preferably, the surfactant composition consists essentially of the propylene glycol and glyceryl fatty acid monoesters. Employable glyceryl fatty acid monoesters include the saturated and unsaturated fatty acid monoesters which contain monoester groups from 12 to 22 carbon atoms inclusive. Illustrative glyceryl fatty acid monoesters are glyceryl monooleate, glyceryl monolinoleate, glyceryl monolinolenate, glyceryl monoeleostearate, glyceryl monoricinoleate, glyceryl monopalmitoleate, glyceryl monostearate, glyceryl monopalmitate, glyceryl monolaurate, glyceryl monomyristate, glyceryl monoarachidate, glyceryl monobehenate, mixtures thereof and the like. Advantageously adapted herein are those glyceryl fatty acid monoesters which contain fatty acid monoester groups from 16 to 18 carbon atoms inclusive with superior results being achieved from the saturated fatty acid monoesters thereof (e.g., glyceryl monosterate).

The propylene glycol fatty acid monoesters adaptable to the mixes are the propylene glycol monoesters having fatty acid groups containing from 12 to 22 carbon atoms including the saturated and unsaturated fatty acid monoesters and mixtures thereof. Typical propylene glycol saturated fatty acid monoesters include propylene glycol monosterate, propylene glycol monolaurate, propylene glycol monoarachidate, propylene glycol monomyristate, propylene glycol monopalmitate, propylene glycol monobehenate, mixtures thereof and the like. Illustrative propylene glycol unsaturated fatty acid monoesters include propylene glycol monooleate, propylene glycol monolinoleate, propylene glycol monoeleosterate, propylene glycol monoricinoleate, propylene glycol monopalmitoleate and the like. Advantageously employable herein are the saturated fatty acid monoesters of propylene glycol with distinct advantages being obtained from the propylene glycol monoesters of saturated fatty acids wherein the fatty acid group contains from 16 to 18 carbon atoms. Exceptional results are achieved by employing propylene glycol monostearate with glyceryl monostearate.

The weight ratio of glyceryl fatty acid monoester to propylene glycol fatty acid monoester ranges from about 1:10 to about 10:1. Advantageously, the weight ratio of glyceryl fatty acid monoester to propylene glycol fatty acid monoester ranges from about 7:3 to about 3:7. Exceptional results in respect to short gel character and foam stability are achieved when the weight ratio of glyceryl fatty acid monoester to propylene glycol fatty acid monoester is about 1:1.

The amount of surfactant composition on a dry weight basis of surfactant to composition may range broadly from about 1:200 to about 200:1. On a total surfactant composition and polysaccharide weight the amount of surfactant composition normally provided in the mix may range from about 2 percent to about 98 percent of the weight thereof. For mixes containing dextrin and the like (i.e., a polysaccharide providing a relatively low peak torque scale reading on a given weight basis), the surfactant composition will generally range from about 2 to about 10 percent by weight of the combined total surfactant and polysaccharide film former weight and preferably about 3 to about 6 percent thereof. Conversely, polysaccharides that provide relatively high peak torque scale readings such as a poly-1,3 β glucoside having a molecular weight in excess of about 250,000, the percent by weight surfactant composition on a total surfactant and polysaccharide basis will normally range from about 75 to about 95 percent and preferably about 80 percent to about 90 percent. Thus, the amount of surfactant composition in relation to the amount of polysaccharide provided in the mix is dependent upon the type of polysaccharide employed.

The polysaccharide can be admixed with the total surfactant composition to provide a single package mix recipe. Such admixtures may be provided by conventional means such as ribbon blenders, verticle mixers, high impact mills and the like. Similarly, a portion or all of the surfactant composition may be included along with or without other food mix ingredients in a separate package.

For cold-water mixes, the surfactant composition is preferably employed in combination with a water-soluble, hydrophilic film former whereby the hydrophilic film former functions as a carrier for the surfactant composition. The resultant surfactant composition carried by the hydrophilic film former should exhibit a solubility of at least 1 gram in 20 ml. of water at 20° C. Such a combination can be provided by co-spray drying or drum drying of an aqueous medium containing the film former and surfactant composition singly or in combination with the other dessert mix ingredients. Under such processing conditions, the resultant surfactant composition carried by the film former is characterized as a solid matrix of hydrophilic film former throughout which there is uniformly distributed surfactant.

Illustrative hydrophilic film formers are agar, gelatin, egg albumen, sodium caseinate, nonfat dry milk solids, whole egg, gum arabic, guar gum, arbinogalactan, locust bean gum, carrageenin, gum tragacanth, sodium alginate, carboxymethyl cellulose, dextrin, gelatinized starch, whey, bran protein, sodium proteinate of soybean, polyvinylpyrrolidone, lower alkylcellulose ethers (e.g., methyl and ethyl celluloses) mixtures thereof and the like.

In addition to hydrophilic film formers, a sugar in combination therewith such as sucrose, lactose, dextrose, mannose, galactose, maltose, fructose, raffinose, mixtures thereof and the like may be employed. Sugars facilitate the dispersion of hydrophilic film formers when the product is used by the ultimate consumer. Cold watersoluble surfactant composition particulates are advantageously provided by the employment of hydrophilic film formers singly or in combination with sugars which exhibit a solubility of at least 1 gram per 10 ml. of water at 20° C. and preferably a solubility of at least 1 gram per 5 ml. of water at 20° C.

Sweetening agents other than the sugars such as artificial sweeteners like calcium, potassium, magnesium or sodium cyclamates, cyclamic acid, sorbitol, saccharin, calcium or ammonium saccharin, glycerine, mixtures thereof and the like may be employed as a mix ingredient and thereby provide a substantial caloric reduction thereof (e.g., a dessert mix possessing at least 50 percent and preferably at least a 75 percent caloric reduction from a mix containing sugar as a sole sweetening agent).

Various other conventional ingredients in quantities and proportions commonly added to dry food mixes such as fats and oils, color and flavor additives, foam stabilizers, preservatives, edible acidulents, buffer salts, additional edible surface active agents and the like may be included, depending upon the ultimate desired product.

Exemplary additional edible surface active agents that may be included are the fatty acid diglycerides such as glyceryl distearate; modified fatty acid monoglycerides (e.g., lactylated, acetylated and tartrated monoglycerides); polyoxyethylene derivatives of partial esters of fatty acids and hexitol anhydrides like polyoxyethylene (20) sorbitan monostearate and polyoxyethylene (15) sorbitan dioleate; partial esters of fatty acid esters and hexitol anhydrides such as sorbitan mono- and distearates, sorbitan mono- and dipalmitates, mixtures thereof and the like.

As previously mentioned, the present dry mix compositions contain less than 8 percent by weight triglyceride and proteinaceous mateerial. Reduction of the amount of fat therein provides a substantial caloric reduction in the final product over conventional similar products. Pursuant thereto, relatively small amounts of proteinaceous film former may be added but are not needed. Exemplary proteinaceous film forming substances for the instant batters include egg albumen, serum albumen, sodium proteinate of soybean, wheat germ, sodium caseinate, nonfat dry milk solids, gelatin, bran protein, pea flour protein, bean flour protein and corn germ. The amount of proteinaceous film former in the mixes may range up to about 5 percent of the total mix solids weight but is usually maintained at less than 3 percent and preferably less than 1 percent.

An exemplary mix suitable for providing an aerated product comprises the following ingredients and amounts thereof:

| Ingredients: | Approximate parts by weight |
|---|---|
| Glyceryl fatty acid monoester | 3–20 |
| Propylene glycol fatty monoester | 4–28 |
| Sweetening agents (sugars generally 20–150) | 0–500 |
| Hydrophilic film forming polysaccharide | 0.25–90 |

Aerated products prepared by reconstitution and aeration of the mixes herein disclosed do not necessitate the presence of proteinaceous materials or triglyceride fats to provide the foamed product thereof. Most generally, the amount of proteinaceous material and triglyceride fat contained in the dry mix will be less than 8 weight percent of the toal dry mix weight. Exceptional results are achieved when the amount of fat or proteinaceous material is less than about 5 weight percent of said total dry mix weight.

The dry mixes provided according to the invention are suitable for a wide range of aerated food products such as toppings, fillings, dips, spreads, frozen desserts or sherbets, fruit freezes and the like. The amount of an aqueous liquid employed to rehydrate the various mixes depends primarily upon the desired ultimate product. Accordingly, the amount of water may vary considerably. Thus, the ultimate product mix may contain from about 30–90 percent by weight water.

Figure 1:
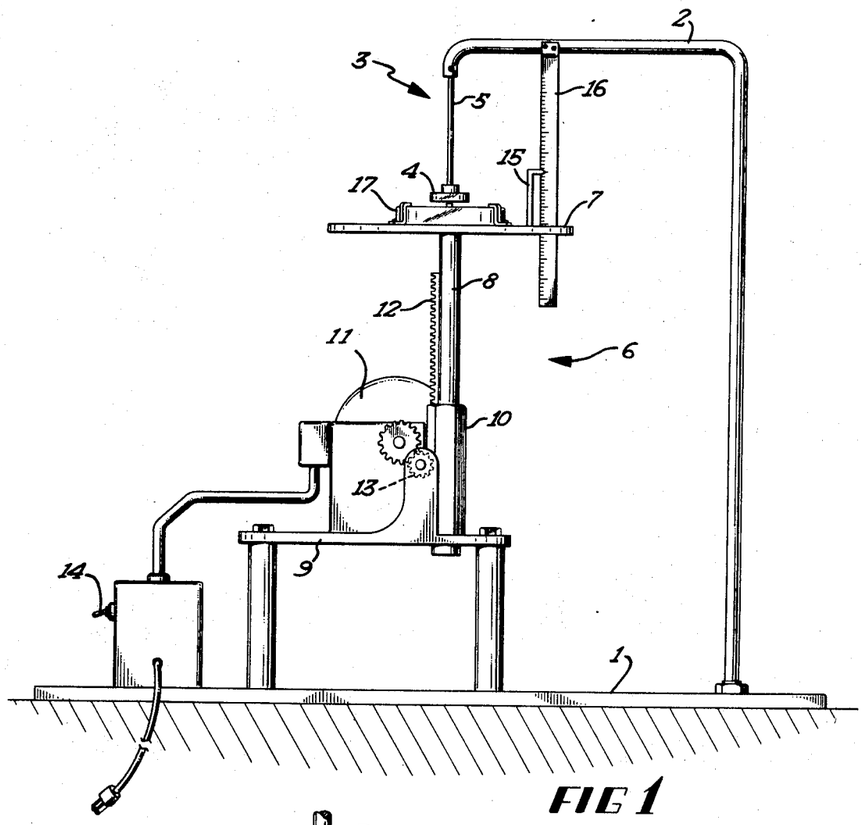
FIG. 1 depicts an apparatus suitable for measuring short gel characteristics.

The edible dry mix composition of the present invention upon hydration and aeration provides a food product of a fine, smooth, creamy consistency (i.e., short gel characteristics). The short gel characteristics disclosed herein and in the examples are objectively measured by a specially designed apparatus which provides a "short gel reading." FIG. 1 depicts an apparatus suitable for providing a "short gel reading." The apparatus depicted in FIG. 1 comprises a base member 1 to which a rigid vertical support member 2 is connected. Rigidly affixed to the upper end of support member 2 is a testing head 3 which consists of a circular plastic disc 4 attached to support rod 5. The lower plane surface of disc 4 is preferably roughened by any suitable means, such as, for example, by means of a crocus cloth.

A vertically movable testing platform indicated generally at 6 consisting of a circular platform 7 carried by vertical rod 8 which is in turn supported by lower platform 9 attached to base member 1. Vertical rod 8 is mounted within sleeve 10 and is adapted to be moved upwardly and downwardly by vertical constant speed, reversible electric motor 11 operating through rack and pinion 12 and 13. Motor 11 is shown connected to a power supply through switch 14.

Circular platform 7 is provided with a rigidly affixed scale indicator 15 which cooperates with calibrated scale 16 (in mm.) attached to vertical support member 2.

Figure 2:
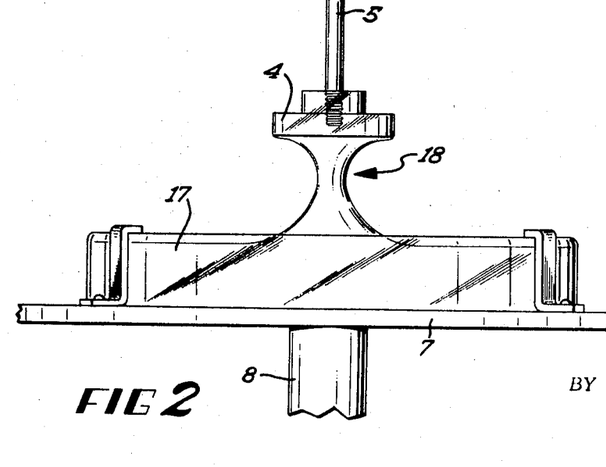
FIG. 2 is an enlarged, fragmentary elevational view of the apparatus depicted in FIG. 1 engaged in measuring the short gel characteristics of a reconstituted mix.

In operation a sample material is placed within any suitable container, such as a petri dish 17, and located upon circular platform 7 in a position substantially coaxial with disc 4. Platform 7 is raised until plane surface 6 of disc 4 is in complete contact (i.e., flush with the disc's 7 plane surface) with the sample in petri dish 17. At that point an initial reading is taken on scale 16. Motor 11 is then engaged to lower platform 7 at a constant speed. As shown in FIG. 2 an adhesive attraction exists between the sample contained in petri dish 17 and disc 4 and a portion thereof which is withdrawn from the petri dish in the form of filamentous mass 18. Platform 7 is lowered at constant speed until the filamentous mass 18 is ruptured at which point a second reading is taken on scale 16 (e.g., motor 11 is stopped and a second reading is taken). The difference in millimeters between the initial and second reading taken on scale 16 is indicative of the product's short gel character.

For purposes of this application, an apparatus as described above having the following dimensions and characteristics was constructed:

Calibrated scale 16—calibrated in millimeters
Circular platform speed—suitably geared to provide a constant speed of 25.4 mm./15 seconds
Disc 4—transparent, plastic, circular disc having a lower plane surface diameter of 1 inch and a verticle thickness of ½ inch.
Petri dish 17—circular diameter of 2¾ inches and a verticle thickness of ½ inch Using the apparatus so constructed, the following test procedure was used to determine the short gel characteristics as evidenced by short gel reading:

Steps (1) Add 100 grams of 95° C. water to 193 grams of dry mix;
(2) Immediately, mix the added water and dry mix under ambient conditions (i.e., 25° C.) with a standard household mixer operated at 600 r.p.m. for 2 minutes;
(3) Immediately after the above (2) add 60 grams of 5° C. water;
(4) Blend immediately thereafter the resultant product obtained from the above (3) with a standard household mixer for 1 minute at 600 r.p.m. under ambient conditions (i.e. 25° C.);
(5) Immediately thereafter, aerate the blended product from the above (4) for 2 minutes with a standard household mixer operated at 900 r.p.m. under ambient conditions (i.e., 25° C.);
(6) Immediately, place sufficient aerated product in petric dish 17 to completely fill dish 17 and removing any excess therefrom (i.e., above the petric dish rim) with a straight edge; and,
(7) Fifteen minutes after the commencement of the aforementioned (1) obtain a short gel reading under ambient conditions (i.e., 25° C.) in accordance with the aforementioned disclosure relating to the apparatus and mode of operation thereof.

Unless expressly stated otherwise herein, the short gel readings disclosed herein and in the appendant claims refers to readings obtained from the above test procedure steps 1–7. Stringy products, in contradistinction to those of short gel characteristics, provide a relatively high reading (e.g., 81 mm.). Short gel readings provided by the instant dry mix composition are less than 35 mm. and most generally range from about 5 mm. to about 30 mm.

In addition to possessing the aforementioned short gel reading characteristics, superior dry mixes are obtained by providing in the mix an appropirate and effective amount of surfactant composition and polysaccharide sufficient to impart to the reconstituted and aerated product thereof stability against substantial changes in the short gel character upon standing. For example, an aerated product which does not contain either a sufficient amount of surfactant and/or polysaccharide or an improper weight ratio thereof will upon standing exhibit a substantial change in short gel readings. This change is indicative of the resultant reconstituted mix gas retention and entrainment properties. Similarly, substantially short gel reading changes are observed in a reconstituted, aerated mix which upon standing exhibits synersis or liquid migration. Thus, subsequent short gel readings of an aerated product provide a convenient means of ascertaining the stability thereof.

By reconstituting and aerating dry mixes as defined hereinbefore and then determining the short gel readings thereof at time intervals of 15, 45, 140 and 180 minutes, stability of a particular dry mix may be ascertained. Aerated products which exhibit a maximum short gel reading (i.e., an "S" reading) differential of less than 15 percent as ascertained at 15, 45, 140 and 180 minutes (i.e., [(a hundred times) the highest "S" reading minus the lowest "S" reading divided by the lowest "S" reading,]) possess a sufficient degree of gas entrainment and retention for use as a dry mix herein. Improved dry mixes possessing enhanced aeration characteristics and stability are provided when the maximum short gel reading differential is less than 10 percent and the short gel reading for the aerated mix ranges from more than 5 to less than 30. Exceptional mixes are provided when the maximum differential is not more than 5 percent and the short gel reading ranges from about 10 to about 20.

Although many of the mixes provided herein do not necessitate the addition of hot water, the aforementioned short gel reading provide a method of physically identifying the persent mixes. Thus, employing a somewhat different apparatus or a modified test procedure, slightly different gel readings may be obtained.

Although the density of reconstituted and aerated mixes provided by the instant mixes differ greatly depending upon the ultimate desired product, the density thereof is less than 1.0. Typical reconstituted and aerated products according to the methododlogy described hereinbefore generally range from about 0.2 to about 0.8.

The following examples are illustrative of the invention:

EXAMPLE I

A lemon-flavored filling and topping mix was prepared by dry blending in a ribbon blender the following ingredients:

| Ingredients: | Pounds |
|---|---|
| Lemon flavoring | 0.25 |
| Powdered citric acid | 0.80 |
| Yellow color premix | 2.50 |
| Salt | 0.35 |
| Gelatinized modified tapioca starch [3] | 11.75 |
| Corn syrup solids | 35.0 |
| Sodium carboxymethyl cellulose | 0.25 |
| Blend of glyceryl monostearate [4] and propylene glycol monostearate | 0.88 |
| Sugar | 48.22 |
|  | 100.00 |

[3] Raw tapioca starch esterified and gelatinized pursuant to FDA Reg. 121:1031 (d).
[4] A fused mixture of glyceryl monostearate and propylene glycol monostearate having a weight ratio of glyceryl monostearate to propylene glycol monostearate from about 35–50 of glyceryl monostearate to 50–65 propylene glycol monostearate.

Several 10-ounce aliquots were placed in separate small mixer bowls to which there was added ¼ cup soft butter and ¾ cup hot water (95° C.) and then blended at a low speed with a standard household mixer. One-quarter cup of cold water (5° C.) was added to the blended product and then whipped with a standard household mixer operated at a high speed for 1 minute.

The whipped resultant product having a specific gravity of 0.84 was adaptable for use as a frosting or filling for layer cakes. The product was stable against synersis even after 7 days of storage under ambient conditions. Mouthfeel, body, meltdown and palatability were of excellent quality without a concomitant pasty, stringy or gummy texture. Short gel reading thereof was about 24 at 15 minutes.

EXAMPLE II

Artificially sweetened lemon-flavored frozen dessert mix

The following ingredients were dry blended in a ribbon blender:

| Ingredients: | Pounds |
|---|---|
| Imitation lemon flavoring | 2.5 |
| Citric acid (powdered) | 8.0 |
| Salt | 3.5 |
| Gelatinized modified tapioca starch | 117.5 |
| Sodium carboxymethyl cellulose | 2.5 |
| 45:55 weight percent fused blend of glyceryl monostearate and propylene glycol monostearate | 8.0 |
| Dextrin | 250.0 |
| Sodium cyclamate | 5.5 |
| Sodium saccharin | 0.5 |
| Artificial coloring | 25.0 |
|  | 423.0 |

To several 59-gram portions of the above mix which had been sifted and dry blended to a homogeneous mixture there was added 74 ml. of hot water (95° C.). The resulting hydrated mixes were then blended with a standard household mixer operated at a low speed for 2 minutes. To the hydrated mixes an additional 74 ml. of cold water (20° C.) was added and the resultant products were whipped with a standard household mixer operated at a high speed for 2 minutes. The resulting dessert product having a specific gravity of 0.48 having short gel properties was then frozen at −20° C. for 4 hours. The frozen product was very similar to ice cream in taste and texture.

EXAMPLE III

A frozen fruit flavored dessert was prepared by employing the ingredients and procedure of Example II with the exception that 100 ml. of hot water (in lieu of the 74 ml. of hot water) was added and the blended product was whipped at a high speed for only 1 minute. Although the degree of aeration was less than the unfrozen product of Example II, the unfrozen product was of a fine, smooth, creamy consistency. The resulting frozen dessert mix had a specific gravity of 0.86 and had a texture and taste similar to a frozen fruit ice or sherbet.

EXAMPLE IV (A) Preparation of spray-dried dextrin-glyceryl monostearate-propylene glycol monostearate premix or dispersion (for use in "cold water" recipe products)

To 485 pounds of water maintained at 165° F., 40 pounds of dextrin was added and agitated until the dextrin was thoroughly dissolved therein. Ten pounds of a 45:55 by weight fused blend of glyceryl monostearate and propylene glycol moonstearate was then added to a hot aqueous dextrin solution (165° F.), melted therein and mixed thoroughly for 10 minutes. The resultant product was then spray dried in a commercial spray drying apparatus.

(B) Preparation of a whipped appetizer dip dry mix

A free-flowing dry mix adaptable for use as a whipped appetizer dip base was prepared from the following ingredients by dry blending in a ribbon blender:

| Ingredients: | Pounds |
|---|---|
| Powdered yellow coloring | 6.0 |
| Salt | 0.9 |
| Gelatinized tapioca starch | 28.4 |
| Sodium carboxymethyl cellulose | 0.6 |
| Spray-dried dextrin-glyceryl monostearate-propylene glycol monostearate | 20.0 |
| Dextrin | 14.0 |
| Corn syrup solids | 30.1 |
|  | 100.0 |

To several 59-gram aliquots of the above mix there was added 150 ml. of tap water (100° F.) and the resultant product was whipped via a standard household mixer operated at a high speed for 3 minutes. The resultant whipped product was of a light, creamy consistency and had a specific gravity of about 0.43. Upon standing, it was also observed that the specific gravity remained substantially the same. An appetizer dip suitable for use as a potato chip dip was then prepared by folding into the whipped product using a standard household mixer operated at a low speed for 20 seconds, 1¼ ounces of a dehydrated onion soup mix.

EXAMPLE V (A) Cold water premixes and products

Employing the methodology of Example IV(A), three distinct cold water premises were prepared by respectively dissolving in 485 pounds of water at 165° F., the following ingredients:

(a) sugar and gum arabic premix
  sugar—20 pounds
  gum arabic—20 pounds
(b) gum arabic premix ,
  gum arabic—40 pounds
(c) arabinogalactan premix
  arabinogalactan—40 pounds As in Example IV, 10 pounds of a 45:55 weight percent fused blend of glyceryl monostearate to propylene glycol moonstearate was added to the above hot aqueous hydrocolloid containing solutions (165° F.), allowed to melt therein, thoroughly mixed therein for 10 minutes and then spray dried.

(B) Sugar-gum arabic premix—cold water soluble toppings

A whipped topping mix was prepared from a blend of the following mix ingredients:

| Ingredients: | Ounces |
|---|---|
| Spray-dried, sugar-gum arabic premix (Example V(A)) | 28.5 |
|     Blend of glyceryl monostearate [4] and propylene glycol monostearate | 5.7 |
|     sugar | 11.4 |
|     gum arabic | 11.4 |
| | 28.5 |
| Sugar | 37.90 |
| Agar-sugar (spray dried 1:10) | 14.30 |
| Gelatinized starch | 18.20 |
| Salt | 0.50 |
| CMC | 0.35 |
| Flavor and color additives | 0.25 |
| | 100.00 |

[4] Ibid., page 19.

In two separate 56.4 gram aliquots of the above blend there was respectively added 4 ounces of cold water (5° C.) and cold milk (5° C.). The respective reconstituted mixes were blended for 1 minute with a standard household mixer at a low speed and whipped at a high speed (i.e., 900 r.p.m.). The resultant whipped product reconstituted with milk has a density of 0.49. The density for the water reconstituted and whipped topping was 0.27. The short gel readings for the resultant reconstituted mixes at 25° C. and 15 minutes were 15.8 for the cold water product and 17.2 for the cold milk product. The short gel reading of the mix after standing 15 minutes at 25° C. when 193 grams of the mix is reconstituted with 100 grams of 95° C. water, mixed with a standard household mixer at 600 r.p.m. for 2 minutes followed by the addition of 60 grams of 5° C. water and subsequent whipping thereof at 90 r.p.m. for 2 minutes was 13.2.

(C) Partially aerated and fully aerated gelatin products

The following mix ingredients were employed in preparing whipped toppings:

| Ingredients: | Ounces |
|---|---|
| Premix (Example V(A)(b)) | 14.7 |
|     Gum arabic | 11.8 |
|     Blend of glyceryl monostearate [4] and propylene | 2.9 |
|     Glycol monostearate [4] | 14.7 |
| Sugar | 65.7 |
| Gelatinized starch | 11.6 |
| Gelatin | 5.2 |
| Citric acid | 1.7 |
| Sodium citrate | .8 |
| Flavoring and coloring additives | .3 |
| | 100.0 |

[4] Ibid., page 19.

A fully aerated whipped topping product was prepared in the following manner:

(1) Add ½ cup of 95° C. water to 3 ounces of the above mix;

(2) Blend in a standard household mixer at a slow speed for 45 seconds to dissolve the mix ingredients;

(3) Add ¾ cup of milk (5° C.) thereto; and, (4) Whip at 900 r.p.m. in a standard household mixer for 3½ minutes.

The resultant whipped topping had a density of 0.60 and a short gel character. Employing water in lieu of milk provides a whipped product having a density of about 0.45.

A two-phase fruit flavored gelled dessert consisting of a cold set unwhipped portion (about 50 percent) and a fully aerated top phase was prepared in the following manner:

(1) Add ¾ cup of 95° C. water to 3 ounces of the above mix;

(2) Blend for 1 minute at 350 r.p.m. with a standard household mixer;

(3) Add ½ cup of cold water (5° C.) and partially aerate with a standard household mixer operated at 600 r.p.m. for 2 minutes; and, (4) Refrigerate for 3 hours.

The whipped product consisted of an upper layer of whipped topping with a non-aerated cold set lower layer. Density of the upper layer was about the same as the fully aerated gelatin product. Both layers possessed a short gel character.

(D) Cold water soluble arabinogalactan whipped topping

Employing the ingredients and recipe of the above IV(B) excepting the substitution therein of 28.5 ounces of the arabinogalactan, propylene glycol monostearate, glyceryl monostearate premix, whipped toppings of similar short gel character and density were prepared. A frozen sample thereof (e.g., −20° C.) similar to a smooth sherbet, ice cream or mousse.

EXAMPLE VI

Short gel readings for various gelatinized starch mixes in the amounts listed in Tables I, II, III and IV were obtained.

In Runs 1–11 and 13–21, all of the above-listed ingredients (excluding the water) were dry blended in a ribbon blender. Unless expressly stated otherwise, regular granulated sugar (sucrose) was employed. The gel readings for the above runs were obtained in the following manner:

(a) Hot water (i.e., greater than 95° C.) in the designated amounts was added to the blended dry mix (immediately followed);

(b) By mixing for 2 minutes with a standard household mixer operated at 600 r.p.m.;

(c) The cold water (in amounts designated) was then added;

(d) The resultant product was further blended with a standard household mixer for 1 minute at 600 r.p.m. and mixed an additional 2 minutes at 900 r.p.m. for 2 minutes; and, (e) Short gel readings at 25° C. were respectively taken at 15, 45, 140 and 180 minutes after the addition of water to the dry mix.

Run 12 results were similarly obtained with the exception that 18.8 grams of the sugar were dry blended and 34.0 grams of sugar were added after the blending of the reconstituted mix. Both Runs 1 and 16 were conducted without the presence of either the glyceryl fatty acid monoester or propylene glycol fatty acid monoester. Although Run 1 provided a product of a relatively low short gel reading, thus indicating the lack of stringiness thereof, the product failed to aerate. Run 16 which in addition to the gelatinized starch contained sugar provided an extremely stringy product. Run 4 provided an aerated product with a short gel character, however, the product was unstable as evidenced by the change in the short gel reading (i.e., 14.7 to 6.9). Run 5 provided a product of short gel character, however, it could not be aerated. Although the product obtained from Run 20 provided a short gel reading, the product could not be aerated. Similar results to that of Run 4 were observed for the hydrated aerated product in Run 21 which in addition to the gelatinized starch and glyceryl monostearate contained sugar, citric acid, corn syrup, salt and carboxymethyl cellulose (reading at 15 minutes—30.0; reading at 180 minutes—23.7). The rehydrated and whipped products obtained from Runs 2, 3, 6–15 and 17–19 which contained both the glyceryl fatty acid monoester and propylene glycol fatty acid monoester provided a product which was susceptible to aeration as well as having short gel characters. Thus, it may be observed from the above tables that the combination of the gelatinized starch, glyceryl fatty acid monoesters and propylene glycol fatty monoesters is necessary to provide an aerated product with a short gel character.

EXAMPLE VII (A) Preparation of a fruit flavored sherbet-type dry mix

| Ingredients: | Pounds |
|---|---|
| Imitation raspberry flavoring | 0.24 |
| Powdered citric acid | .80 |
| Salt | .35 |
| Gelatinized tapioca starch | 11.75 |
| Sodium carboxymethyl cellulose | .25 |
| Dextrin-glyceryl monostearate-proplylene glycol monostearate [15] | 25.8 |
| Artificial coloring | 2.5 |
| Artificial sweetener blend | 6.0 |

| | |
|---|---|
| Sodium cyclamate | 5.5 |
| Sodium saccharin | 0.5 |
| | 6.0 |

[15] Prepared according to Example IV (A).

TABLE I

| Run No. | Ingredients (parts by weight) | | | | | | | | | Short gel characteristics in— | | | |
|---|---|---|---|---|---|---|---|---|---|---|---|---|---|
| | Starch | Water | GMS [1] | PGMS [2] | Sugar | Citric acid | Corn syrup | Salt | CMC | 15 mins. | 45 mins. | 140 mins. | 180 mins. |
| 1 | 11.75 | [3]92.5+[4]92.5 | | | | | | | | 8.0 | 10.0 | 12.5 | 12.1 |
| 2 | 11.75 | [3]92.5+[4]92.5 | [5]0.35 | [5]0.53 | | | | | | 14.4 | 15.6 | 14.8 | 15.0 |
| 3 | 11.75 | [6]92.5+[4]92.5 | 0.35 | [5]0.53 | | | | | | 14.1 | 15.6 | 15.0 | 14.5 |
| 4 | 11.75 | [3]92.5+[4]94.5 | 0.88 | | | | | | | 14.7 | 10.7 | 7.3 | 6.9 |
| 5 | 11.75 | [3]92.5+[4]94.5 | | 0.88 | | | | | | 12.6 | 13.9 | 13.6 | 12.9 |

For footnotes see end of Table IV.

TABLE II

| Run No. | Ingredients (parts by weight) | | | | | | | | | Short gel characteristics in— | | | |
|---|---|---|---|---|---|---|---|---|---|---|---|---|---|
| | Starch | Water | GMS [1] | PGMS [2] | Sugar | Citric acid | Corn syrup | Salt | CMC | 15 mins. | 45 mins. | 140 mins. | 180 mins. |
| 6 | 11.75 | [3]92.5+[4]94.5 | 0.35 | 0.53 | | | | | | 14.8 | 14.3 | 14.3 | 14.3 |
| 7 | 11.75 | [3]92.5+[4]94.5 | [5]0.35 | [5]0.53 | 86 | | | | | 14.9 | 14.7 | 15.5 | 15.9 |
| 8 | 11.75 | [3]92.5+[4]94.5 | [5]0.35 | [5]0.53 | 86 | 0.82 | | | | 16.0 | 15.6 | 16.2 | 15.2 |
| 9 | 11.75 | [3]92.5+[4]94.5 | [4]0.35 | [4]0.53 | 86 | 0.82 | | | 0.25 | 16.5 | 15.9 | 15.5 | 16.2 |
| 10 | 11.75 | [3]92.5+[4]94.5 | [5]0.35 | [5]0.53 | 52.8 | 0.82 | 33.2 | | 0.25 | 15.0 | 16.1 | 15.6 | 15.8 |
| 11 | 11.75 | [3]51.7+[4]34.5 | [5]0.35 | [5]0.53 | 52.8 | 0.82 | 33.2 | | 0.25 | 19.6 | 21.4 | 21.0 | 21.8 |

For footnotes see end of Table IV.

TABLE III

| Run No. | Ingredients (parts by weight) | | | | | | | | | Short gel characteristics in— | | | |
|---|---|---|---|---|---|---|---|---|---|---|---|---|---|
| | Starch | Water | GMS [1] | PGMS [2] | Sugar | Citric acid | Corn syrup | Salt | CMC | 15 mins. | 45 mins. | 140 mins. | 180 mins. |
| 12 | 11.75 | [3]51.7+[4]34.5 | [5]0.35 | [5]0.53 | 18.8+[7]34.0 | 0.82 | 33.2 | | 0.25 | 21.2 | 22.4 | 21.5 | 22.2 |
| 13 | 11.75 | [3]51.7+[4]34.5 | [5]0.35 | [5]0.53 | [8]52.8 | 0.82 | 33.2 | | 0.25 | 22.4 | 23.8 | 23.3 | 23.7 |
| 14 | 11.75 | [3]51.7+[4]34.5 | [5]0.35 | [5]0.53 | [8]52.8 | 0.82 | 33.2 | | 0.25 | 23.3 | 25.9 | 25.6 | 25.9 |
| 15 | 11.75 | [3]51.7+[4]34.5 | [5]0.35 | [5]0.35 | [8]52.8 | 0.82 | 33.2 | 0.35 | 0.25 | 22.0 | 24.2 | 24.1 | 23.5 |
| 16 | 11.75 | [3]51.7+[4]34.5 | | | [8]52.8 | 0.82 | 33.2 | 0.35 | 0.25 | 53.7 | 81.0 | 81.8 | 81.0 |

For footnotes see end of Table IV.

TABLE IV

| Run No. | Ingredients (parts by weight) | | | | | | | | | Short gel characteristics in— | | | |
|---|---|---|---|---|---|---|---|---|---|---|---|---|---|
| | Starch | Water | GMS [1] | PGMS [2] | Sugar | Citric acid | Corn syrup | Salt | CMC | 15 mins. | 45 mins. | 140 mins. | 180 mins. |
| 17 | 11.75 | [3]51.7+[4]34.5 | 0.40 | 0.48 | [8]52.8 | 0.82 | 33.2 | 0.35 | 0.25 | 26.5 | 29.0 | 30.0 | 26.9 |
| 18 | 11.75 | [3]51.7+[4]34.5 | 0.18 | 0.70 | [8]52.8 | 0.82 | 33.2 | 0.35 | 0.25 | 27.5 | 29.1 | 28.6 | 27.4 |
| 19 | 11.75 | [3]51.7+[4]34.5 | 0.70 | 0.18 | [8]52.8 | 0.82 | 33.2 | 0.35 | 0.25 | 24.9 | 26.0 | 25.9 | 27.0 |
| 20 | 11.75 | [3]51.7+[4]34.5 | | 0.88 | [8]52.8 | 0.82 | 33.2 | 0.35 | 0.25 | 28.1 | 29.9 | 28.9 | 29.2 |
| 21 | 11.75 | [3]51.7+[4]34.5 | 0.88 | | [8]52.8 | 0.82 | 33.2 | 0.35 | 0.25 | 30.3 | 31.0 | 27.4 | 23.7 |

[1] Glyceryl monostearate.
[2] Propylene glycol monostearate.
[3] At 75° C.
[4] At 5° C.
[5] Fused mixture of 40 percent by weight GMS and 55 percent by weight PGMS.
[6] Boiling water was used.
[7] Sugar added after blending but before aeration.
[8] Granulated sucrose.

(B) Preparation of the fruit flavored "freeze-type" frozen dessert mix

To 59-gram portions of the above free-flowing fruit flavored "freeze" dry mix there was added 150 ml. of water (100° F.) and it was then mixed with a standard household mixer operated at a high speed for 3 minutes. The resulting product had a specific gravity of 0.26 and of a smooth, aerated, creamy texture. Upon standing under ambient conditions for 30 hours, no concomitant formations of a hard, tough skin or syneresis was observed. Density of the product upon standing remained substantially the same. The product was similar in light whipped character and smooth eating quality to a flavored whipped cream.

EXAMPLE VIII

Edible, dry blended topping mix compositions were prepared with various water-soluble, hydrophilic film forming polysaccharides. The polysaccharides and the amounts thereof along with the additional dry mix ingredients are set forth in Table V.

O, however, was not deemed sufficiently firm or stable when stored over a prolonged period of time. This lack of firmness can be obviated either by the utilization of a more viscous hydrophilic film former (alone or in combination with gum arabic); if the hydrophilic film former has a comparable or lesser viscosity by increasing the net amount of polysaccharide utilized. Hydrophilic film formers such as carboxymethyl cellulose, hydropropyl cellulose, poly-1,3-β-glucoside and propylene glycol alginate provide a film aerated structure even though a lesser amount of polysaccharide was employed. On the other hand, Mixes H and N contained a hydrophilic film forming polysaccharide characterized as imparting a lesser degree of firmness in the aerated product than gum arabic per se. By increasing the amount of film forming agent along with a corresponding increase in the recipe mix to water ratio, the desired degree of firmness was achieved for those mixes prepared from polysaccharides which do not inherently provide the desired firming character (e.g., note Mixes H, I, L and N). Notwithstanding the fact that the above Mixes A through O did not contain any fat or

TABLE V

| Mix | Polysaccharide | Polysaccharide weight | Premix [1] | Added sucrose | Salt | PGMS [2] | GMS [2] | Coloring | Flavoring | Grams of mix in recipe | "S" value in mm. after whipping | Density after whipping |
|---|---|---|---|---|---|---|---|---|---|---|---|---|
| A | Sodium carboxymethyl celluslose. | 2.00 | 28.0 | 67.7 | 0.506 | 3.35 | 2.35 | 0.396 | 1.405 | 56.0 | 13.6 | 0.190 |
| B | Guar gum | 7.50 | 28.0 | 62.2 | 0.506 | 3.25 | 2.35 | 0.396 | 1.405 | 56.0 | 18.5 | 0.219 |
| C | Locust bean gum | 10.50 | 28.0 | 59.2 | 0.506 | 3.25 | 2.35 | 0.396 | 1.405 | 56.0 | 17.8 | 0.240 |
| D | Gum tragacanth | 10.50 | 28.0 | 59.2 | 0.506 | 3.25 | 2.35 | 0.396 | 1.405 | 56.0 | 16.2 | 0.219 |
| E | Poly-1,3β glucoside spray-dried premix [3]. | [3] 1.132 | 28.0 | 69.4 | 0.506 | 3.28 | 2.38 | 0.396 | 1.405 | 56.0 | 13.3 | 0.166 |
| F | Furcelleran | 6.70 | 28.0 | 63.0 | 0.506 | 3.25 | 2.35 | 0.396 | 1.405 | 56.0 | 10.0 | 0.202 |
| G | Pectin-low methoxy | 5.80 | 28.0 | 63.9 | 0.506 | 3.25 | 2.35 | 0.396 | 1.405 | 56.0 | 10.6 | 0.194 |
| H | Dextrin [4] | 97.5 | 28.0 | 0.0 | 0.506 | 3.25 | 2.35 | 0.396 | 1.405 | 89.0 | 11.6 | 0.203 |
| I | Agar-agar premix [5] | [5] 11.3 | 28.0 | 63.9 | 0.506 | 3.25 | 2.35 | 0.396 | 1.405 | 82.0 | 10.0 | 0.312 |
| J | Sodium alginate | 44.0 | 28.0 | 65.3 | 0.506 | 3.25 | 2.35 | 0.396 | 1.405 | 56 | 14.8 | 0.272 |
| K | Propylene glycol alginate | 2.60 | 28.0 | 67.1 | 0.506 | 3.25 | 2.35 | 0.396 | 1.405 | 56 | 8.3 | 0.181 |
| L | Gum arabic | 88.0 | 28.0 | 0.0 | 0.506 | 3.25 | 2.35 | 0.396 | 1.405 | 66.0 | 16.0 | 0.207 |
| M | Hydroxypropyl cellulose | 4.00 | 28.0 | 65.7 | 0.506 | 3.25 | 2.35 | 0.396 | 1.405 | 56.0 | 9.2 | 0.142 |
| N | Dextrin [6] | [6] 122.5 | 28.0 | 0.0 | 0.506 | 3.25 | 2.35 | 0.396 | 1.405 | 156.0 | 7.3 | 0.298 |
| O | Gum arabic | [7] 11.2 | 28.0 | 69.7 | 0.506 | 3.25 | 2.35 | 0.396 | 1.405 | 56.0 | 11.0 | 0.146 |

[1] All topping mixes contained the sugar-gum arabic premix prepared in accordance with an identical composition to that of Example VB.
[2] Provided in the mix as a spray-dried premix ingredient comprised of a fused mixture of glyceryl monostearate and propylene glycol monostearate having a weight ratio of GMS to PGMS from about 35 to 50 of GMS to 50 to 65 PGMS.
[3] A water-soluble, linear poly-1,3β glucoside having on every third glucose moiety of the chain a 1,6-glucoside prepared in accordance with the teachings of U.S. Pat. No. 3,301,848 by Frank Halleck. The spray-dried premix prepared in a similar manner to that of Example VB consisting (on a weight ratio) of 4 percent poly-1,3β glucoside, 20 percent of a blend of glyceryl monostearate and propylene glycol monostearate, 36 percent gum arabic and 40 percent sugar. The 1.132 parts by weight polysaccharide was provided by the 28.0 parts by weight premix.
[4] Hydrolyzed cereal solids containing about 25 percent by weight heptosaccharide or less with the remaining portion thereof being dextrin.
[5] Provided as a spray-dried premix consisting (on a weight basis) of 10 percent agar-agar, 12 percent sucrose, 47 percent calcium sulfate and 31 percent dextrose. Thus, 113 grams of the premix containing 10 percent agar-agar was used in formulating Mix I.
[6] Provided as a corn syrup solid having a dextrose equivalent between 24 to 28 and comprised of the following composition:

| | Percent |
|---|---|
| Monosaccharides | 9 |
| Disaccharides | 8 |
| Trisaccharides | 8 |
| Tetrasaccharides | 8 |
| Pentasaccharides | 7 |
| Hexasaccharides | 6 |
| Heptasaccharides | 5 |
| Octasaccharides and above | 49 |

(i.e., 8 to about 40 to 50 saccharide unit dextrins)
The octasaccharide and above portion (i.e., 49%) contains dextrin which functions as the water-soluble polysaccharide film former component thereof.
From premix.

To the aforementioned Mixes A through O set forth in Table V employing the amount of mix designated in the column under the heading "Grams of Mix in Recipe," there was added to each mix 8 ounces of hot water (95° C.). The mix was reconstituted by mixing for 2 minutes with a standard household mixer operated at 600 r.p.m. After allowing the reconstituted mixes to cool to about 20° C., the cooled reconstituted product was aerated by whipping with a standard household mixer operated at 900 r.p.m. for three minutes. Short gel readings and density of the resultant whipped toppings as determined are listed in the last two columns of Table V. A comparison between the respective "S" values with the amount of polysaccharide provided in Mixes A to O illustrates that certain polysaccharides on a given weight basis provided greater gas retention properties and supportive matrix while still maintaining the desired short gel character than certain other polysaccharides. Although all of the aforementioned mixes in Table V contained 11.2 parts by weight gum arabic, the gum arabic as provided by premix may be eliminated or substituted with another polysaccharide hydrophilic film former. As indicated in Table V, Mix O provided an "S" value of 11.0 and an after whipping density of 0.146. The resultant whipped product of Mix O, however, was not deemed sufficiently firm or stable proteinaceous material as a whipping agent, Table V illustrates that dry mix compositions relying principally upon the hydrophilic film former in combination with the surfactant composition provide acceptable whipped products.

As may be seen from the aforementioned examples, the spray-dried particulate composition facilitates the cold water dispersibility of the mix ingredients. In general, this premix composition is comprised of a matrix of an edible hydrophilic film former and a surfactant composition which is uniformly distributed throughout the matrix. The surfactant composition utilized in providing the particulate cold water soluble ingredients herein comprises at least one glyceryl monoester of a fatty acid and at least one propylene glycol fatty acid monoester with a weight ratio of the glyceryl monoester to propylene glycol monoester ranging from about 3:7 to about 7:3. In general, the particulate composition is further characterized as exhibiting a solubility of at least 1 part of the particulate composition for each 5 parts of water in which the particulate composition is dispersed. In general, the surfactant composition contains at least 10 percent by weight of the aforementioned glyceryl monoesters and propylene glycol monoesters and at least 20 percent by weight of a hydrophilic film former. Triglyceride fats such as hydrogenated vegetable shortening and animal fats will adversely effect the cold water solubility thereof. Accordingly, the amount of triglyceride fat contained in the particulate composition should be maintained as low as possible (e.g., no more than 5 percent triglyceride and advantageously less than 3 to 1 percent triglyceride fat). Advantageously, the film former employed in the particulate composition is a polysaccharide composition as defined hereinbefore. Those polysaccharides which contribute higher peak torque values necessitate less polysaccharide than those which, on a given weight basis, provide lower peak torque values. If a polysaccharide which provides a relatively high peak torque value is employed, it is advantageous to include within the mix another cold water soluble ingredient such as mono- and disaccharides and the like (e.g., dextrose, lactose, sucrose, fructose, maltose and the like). Typical amounts of sugar provided in the cold water soluble particulate composition may range from about 20 to about 80 weight percent of the total particulate composition by weight. In the case of polysaccharides which contribute a lesser amount of peak torque values on a given weight basis, it is not necessary to employ an additional cold water soluble ingredient such as a sugar. Typical ingredients which do not necessitate the presence of sugar include arabinogalactan, dextrin, gum arabic and the like.

What is claimed is:

1. An edible dry mix composition containing less than 8 percent by weight triglyceride fat and proteinaceous material and which upon hydration and mixing provides an aerated food product of a fine, smooth, creamy consistency having a short gel reading of less than 35, said mix composition comprising at least one hydrophilic film forming polysaccharide and surfactant composition, the amount of polysaccharide being provided in the mix being characterized on a 240 gram mix basis as sufficient to provide a peak torque ranging from about 100 to about 180 scale units when the amount of polysaccharide film former provided in said 240 grams of mix, excluding the remaining ingredients therefrom is reconstituted with 220 grams of sucrose in 473 grams of water, said amount ranging from 0.25 weight percent for a very high viscous polysaccharide to about 90 weight percent for a low viscous polysaccharide, the amount of surfactant composition on a dry weight ratio basis of polysaccharide to surfactant composition ranges from at least 200:1 to about 1:200 and said surfactant composition comprises at least one glyceryl monoester of a fatty acid and at least one propylene glycol fatty acid monoester, said mix containing a weight ratio of glyceryl monoester to propylene glycol monoester ranging from about 1:10 to about 10:1.

2. The mix according to claim 1 wherein said mix is characterized as providing a short gel reading at 25° C. at 15 minutes ranging from about 5 mm. to about 30 mm. with the polysaccharide being the principal hydrophilic film former contained within said mix.

3. The mix according to claim 2 wherein at least a major portion of the propylene glycol fatty acid monoesters and glyceryl fatty acid monoesters consist of fatty acid monoesters having from 16 to 18 carbon atoms inclusive.

4. The mix according to claim 3 wherein the amount of polysaccharide provided in the mix is sufficient to provide a peak torque ranging from 120 to 160 scale units with the polysaccharide providing at least 80 percent of the peak torque scale units therein.

5. The mix according to claim 4 wherein the weight ratio of glyceryl fatty acid monoester to propylene glycol fatty acid monoester ranges from about 40 to about 60.

6. The mix according to claim 5 wherein the hydrophilic film forming polysaccharide is at least one member selected from the group consisting of the water-soluble cellulosic derivatives, gum tragacanth, gum arabic, furcelleran, the water-soluble salts of furcelleran, carrageenin, the water-soluble salts of carrageenin, the water-soluble alginates, dextrin, locust bean gum and a poly-1,3 $\beta$ glucoside.

7. The mix according to claim 6 which contains a sweetening agent in an amount ranging from about 5 to about 90 weight percent of the total dry mix weight.

8. The mix according to claim 7 wherein at least a major portion of the polysaccharide hydrophilic film former on a weight basis is dextrin.

9. The mix according to claim 8 wherein the dextrin is provided in the mix by corn syrup solids.

10. The mix according to claim 9 wherein the mix contains at least one additional hydrophilic film forming polysaccharide characterized as providing at least four times as many scale units as dextrin on an equivalent weight basis.

11. The mix according to claim 5 wherein the major contributing factor in providing the peak torque value is a hydrophilic film forming polysaccharide selected from the group consisting of a lower alkyl cellulose ether wherein the alkyl group contains from 1 to 4 carbon atoms inclusive, a water-soluble salt of carboxymethyl cellulose, locust bean gum, sodium pectinate, a low methoxy pectin, a water-soluble alginate, a water-soluble poly-1,3 $\beta$ glucoside, furcelleran, the water-soluble salts of furcelleran, carrageenin and the water-soluble salts of carrageenin.

12. The mix according to claim 11 wherein the amount of fat and proteinaceous material contained therein based upon the total dry weight thereof is less than 5 weight percent.

13. The mix according to claim 12 wherein the short gel reading thereof ranges from about 10 to about 30.

14. The mix according to claim 13 wherein the major contributing factor to the peak torque value is a lower alkyl cellulose ether wherein the alkyl group contains 1 to 4 carbon atoms inclusive.

15. The mix according to claim 13 wherein the major contributing factor to the peak torque value is sodium carboxymethyl cellulose.

16. The mix according to claim 13 wherein the major contributing factor to the peak torque value is one member selected from the group consisting of furcelleran and the water-soluble salts of furcelleran.

17. The mix according to claim 13 wherein the major contributing factor to the peak torque value is selected from the group consisting of carrageenin, ammonium, alkali and alkaline metal salts of carrageenin.

18. The mix according to claim 13 wherein the major contributing factor to the peak torque value is at least one alginate selected from the group consisting of propylene glycol alginate, potassium alginate, calcium alginate and sodium alginate.

19. The mix according to claim 13 wherein the major contributing factor to the peak torque value is at least one member selected from a group consisting of pectin, low methoxy pectin and sodium pectinate.

20. The mix according to claim 13 wherein the major contributing factor to the peak torque value is comprised of a water-soluble poly-1,3-$\beta$-glucoside.

21. The mix according to claim 13 wherein the major contributing factor to the peak torque value is at least one member selected from the group of gum tragacanth, gum arabic, dextrin, locust bean gum and arabinogalactan.

22. The mix according to claim 2 wherein the weight ratio of glyceryl fatty acid monoester to propylene glycol monoester ranges from about 7:3 to about 3:7.

23. The mix according to claim 22 wherein the amount of polysaccharide provided in the mix is sufficient to provide a peak torque ranging from 120 to 160 scale units with the polysaccharide providing at least 80 percent of the peak torque scale units therein.

24. A cold water soluble mix according to claim 23 wherein the surfactant composition is provided in the mix as a surfactant composition particulate having a solubility of at least 1 part by weight per 5 parts by weight water at 20° C., said particulate comprising an edible hydrophilic film and surfactant composition.

25. A cold water soluble mix according to claim 24 wherein the surfactant composition is provided in the mix as a powdered composition exhibiting a solubility in 20° C. water of at least 1 part powdered composition per 5 parts of water, said powdered composition comprising a matrix of an edible hydrophilic film former with uniform distribution through said matrix of the surfactant composition.

26. The cold water soluble mix according to claim 25 wherein the surfactant composition contains propylene glycol monostearate and glyceryl monostearate as the principal surfactants therein.

27. The cold water soluble mix according to claim 26 wherein the powdered composition is spray-dried surfactant composition comprising a hydrophilic film forming polysaccharide and sugar.

28. The cold water soluble mix according to claim 27 wherein the hydrophilic film forming polysaccharide is arabinogalactan.

29. The cold water soluble mix according to claim 28 wherein the hydrophilic film forming polysaccharide is gum arabic.

30. The cold water soluble mix according to claim 29 wherein the hydrophilic film forming polysaccharide is dextrin.

31. The mix according to claim 23 wherein the amount of film former contained in said mix is sufficient to provide a peak torque value ranging from 130 to 150 scale units with the polysaccharide providing at least 90 of the peak torque value.

32. The mix according to claim 31 wherein the glycercyl fatty acid monoester is glyceryl monostearate and the propylene glycol fatty acid monoester is propylene glycol monostearate and the short gel reading thereof ranges from about 10 to about 20.

33. The mix according to claim 32 wherein the maximum short gel reading differential at 15, 45, 140 and 180 minutes is less than 10 percent.

34. The mix according to claim 33 wherein the weight ratio of glyceryl monoester to propylene glycol monoester is about 1:1.

35. The method of providing an aerated food product containing less than 8 percent triglyceride fat and proteinaceous material, said product being of a fine, smooth, creamy consistency with a short gel reading of less than 35, said method comprising the steps of:
(a) providing as dry mix ingredients a mix as characterized in claim 1;
(b) reconstituting and blending said mix in an aqueous medium to provide a blended product containing from about 30 to 90 percent by weight water; and,
(c) aerating said blended product under mixing conditions sufficient to provide a short gel reading of less than 35 and a product density of less than 1.0 grams per cubic centimeter.

36. The method according to claim 35 wherein the dry mix ingredients contain a weight ratio of glyceryl fatty acid monoester to propylene glycol monoester ranging from about 7:3 to about 3:7.

37. The method according to claim 36 wherein the dry mix is characterized as providing a short gel reading at 25° C. at 15 minutes ranging from about 5 mm. to about 30 mm. with the polysaccharide being the principal hydrophilic film former in providing the peak torque value of the ingredients.

38. The method according to claim 37 wherein the dry mix ingredients contain from 0% by weight to about 5% by weight with the amount of polysaccharide and proteinaceous film former provided in the mix being sufficient to provide a peak torque ranging from 120 to 160 scale units with the polysaccharide providing at least 80 percent of the peak torque scale units therein.

39. The method according to claim 38 wherein a major portion of the surfactant composition is provided in the mix as a surfactant composition particulate having a solubility of at least 1 part by weight per 5 parts by weight water at 20° C., said particulate comprising an edible hydrophilic film and a surfactant composition.

40. The method according to claim 39 wherein the surfactant composition is provided in the mix as a powdered composition exhibiting a solubility in 20° C. water of at least 1 part powdered composition per 5 parts of water, said powdered composition comprising a matrix of an edible hydrophilic film former with uniform distribution through said matrix of the surfactant composition.

41. The method according to claim 40 wherein the surfactant composition contains propylene glycol monostearate and glyceryl monostearate as the principal surfactants therein.

42. The method according to claim 41 wherein the powdered composition is spray-dried surfactant composition comprising a hydrophilic film forming polysaccharide and sugar.

43. The method according to claim 41 wherein a major portion of the hydrophilic film forming polysaccharide on a weight basis is arabinogalactan.

44. The method according to claim 41 wherein a major portion of the hydrophilic film forming polysaccharide on a weight basis is gum arabic.

45. The method according to claim 41 wherein a major portion of the hydrophilic film forming polysaccharide on a weight basis is dextrin.

46. The method according to claim 41 wherein substantially all of the propylene glycol fatty acid monoesters and glyceryl fatty acid monoesters is provided by the spray-dried composition.

47. The method according to claim 41 wherein the amount of film former provided in said mix is sufficient to provide a peak torque value ranging from 130 to 150 scale units with the polysaccharide providing at least 90 of the peak torque value.

48. The method according to claim 47 wherein the aerated product has a short gel reading ranging from about 10 to about 20.

49. The method according to claim 48 wherein the maximum short gel reading differential of the aerated product at 15, 45, 140 and 180 minutes is less than 10 percent.

50. The method according to claim 49 wherein the weight ratio of glyceryl monoester to propylene glycol monoester is about 1:1.

51. The method according to claim 50 wherein the hydrophilic film forming polysaccharide selected from the group consisting of a lower alkyl cellulose ether wherein the alkyl group contains from 1 to 4 carbon atoms inclusive, a water-soluble salt of carboxymethyl cellulose, locust bean gum, sodium pectinate, a low methoxy pectin, a water-soluble alginate, a water-soluble poly-1,3 β glucoside, furcelleran, the water-soluble salts of furcelleran, carrageenin and the water-soluble salts of carrageenin.

52. A particulate composition adapted to facilitate the cold water dispersibility of mix ingredients, said particulate composition comprising a matrix of an edible hydrophilic film former and a surfactant composition with said surfactant composition being uniformly distributed throughout said matrix, said surfactant composition comprising at least one glyceryl monoester of a fatty acid and at least one propylene glycol fatty acid monoester with the weight ratio of glyceryl monoester to propylene glycol monoester ranging from about 3:7 to 7:3, said particulate composition being further characterized as having a solubility of at least 1 part by weight particulate composition per 5 parts by weight water at 20° C. and containing at least 10 percent by weight surfactant composition and at least 20 percent by weight hydrophilic film former and no more than 5 percent by weight triglyceride fat.

53. The particulate composition according to claim 52 wherein at least a major portion of the hydrophilic film former on a weight basis is a polysaccharide.

54. The particulate composition according to claim 53 wherein the surfactant composition contains propylene glycol monostearate and glyceryl monostearate as the principal surfactants therein.

55. The particulate composition according to claim 54 wherein the particulate composition contains as a principal polysaccharide as evidenced by its peak torque value, a polysaccharide having a peak torque value greater than an equivalent weight of gum arabic.

56. A spray-dried particulate composition according to claim 55 wherein the composition contains from at least 10 percent to about 50 percent by weight surfactant composition, from about 20 percent to about 80 percent by weight of at least one member selected from the group consisting of mono- and disaccharide and from at least 20 percent to 95 percent by weight hydrophilic film former.

57. The cold water particulate composition according to claim 54 wherein the principal hydrophilic film forming polysaccharide on a weight basis is arabinogalactan.

58. The cold water particulate composition according to claim 54 wherein the principal hydrophilic film forming polysaccharide on a weight basis is gum arabic.

59. The cold water particulate composition according to claim 54 wherein the principal hydrophilic film forming polysaccharide on a weight basis is dextrin.

References Cited

UNITED STATES PATENTS

| | | | |
|---|---|---|---|
| 2,913,342 | 11/1959 | Cameron et al. | 99—139 |
| 3,295,986 | 1/1967 | Saslaw et al. | 99—139X |
| 3,330,667 | 7/1967 | Tressler | 99—139 |
| 3,343,967 | 9/1967 | Rubenstein | 99—139X |
| 3,434,848 | 3/1969 | Katz | 99—139 |

RAYMOND N. JONES, Primary Examiner

J. M. HUNTER, Assistant Examiner

U.S. Cl. X.R.

99—136